Patented Apr. 28, 1936

2,038,593

UNITED STATES PATENT OFFICE 2,038,593

BUTADIENES AND CHLORINATED DERIVATIVES THEREOF

Irving Elkin Muskat, Chicago, Ill., assignor to E. I. du Pont de Nemours & Company, Wilmington, Del., a corporation of Delaware No Drawing. Application October 21, 1931
Serial No. 570,152

32 Claims. (Cl. 260—162)

This invention relates to the preparation of organic compounds and pertains more particularly to the production of diene hydrocarbons and chlorinated derivatives thereof, many of which derivatives are novel.

Butadiene-1,3 has been of interest in the past due to the possibility of its being used as a raw material for the production of synthetic rubber, and considerable research experimentation has been done relative to the preparation of this hydrocarbon. Caventou Ann., 127, 348 (1863), has obtained butadiene by passing the vapors of fusel oil thru a hot tube, and since then it has been found in varying amounts in the pyrogenic decompositions of numerous organic compounds. Many potential methods for preparing butadiene depend upon the cracking of petroleum hydrocarbons. Yields of butadiene obtained by the methods referred to have invariably been low.

A method for the preparation of butadiene-1,3 distinct from previously known methods, has been suggested by Perkin J. Soc. Chem. Ind., 31, 618 (1912). This method depends upon the reaction of n-butyl alcohol with dry hydrogen chloride to form n-butyl chloride which is then reacted with chlorine to give a mixture of dichlorobutanes. The dichlorobutanes are passed over soda lime at elevated temperature, yielding up their chlorine content by scission of hydrogen chloride molecules, the final product being butadiene.

The present invention deals in particular with an improvement over Perkin's process of preparing butadiene-1,3.

A further feature of the invention deals with the chlorination of butadiene-1,3. The addition of bromine to butadiene was studied by Griner Compt. Rend., 116, 723, (1893); 117, 553 (1893); by Thiele, Ann., 308, 333 (1899) and by Farmer et al, J. Chem. Soc. 729, 1928. Among the brominated products obtained by these investigators are the dibromo-1,2-butene which is normally a liquid, and the dibromo-1,4-butene, which is normally a solid melting at 53°–54° C. Ipatiew, J. Prakt. Chem., (2) 67, 420 (1903) studied the addition of hydrogen bromide to butadiene and obtained an unsaturated bromide, C₄H₇Br, the structure of which he did not determine. Other publications dealing with the study of halogen addition reactions of diene hydrocarbons are as follows:

Muskat & Huggins, J. Am. Chem. Soc. 51, 2496 (1929), Muskat, Becker & Lowenstein, Ibid., 52, 326 (1930), Muskat & Becker, Ibid., 52, 812 (1930), Muskat & Grimsley, Ibid., 52, 1574 (1930).

Objects of the present invention relate to a process for preparing butadiene-1,3

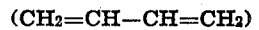

(CH₂=CH—CH=CH₂)

and a process for deriving from butadiene-1,3 certain chlorine derivatives thereof. The objects of the invention also pertain to the production of the new chlorine substituted hydrocarbons, dichloro-1,2-butene-3

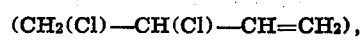

(CH₂(Cl)—CH(Cl)—CH=CH₂), dichloro-1,4-butene-2

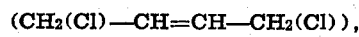

(CH₂(Cl)—CH=CH—CH₂(Cl)), and chloro-1-butadiene-1,3

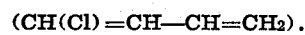

(CH(Cl)=CH—CH=CH₂).

Other specific objects of the invention will appear hereinafter.

In preparing butadiene-1,3 in accordance with the present invention, n-butyl alcohol was converted into n-butyl chloride according to the method of Norris, "Organic Syntheses" vol. 5, p. 27 (1925), by heating the alcohol with concentrated hydrochloric acid and anhydrous zinc chloride. The pure chloride was then further chlorinated to the dichloride by reacting with chlorine. The chlorinated reaction mixture was then distilled thru a fractionating column and the distillate collected in separate fractions. From the distillation temperature of the fractions collected it appears that the chlorinated product consisted of a mixture of some unreacted butyl chloride and the 1,2-, 1,3-, and 1,4-dichlorobutanes. Each of the fractions of the dichlorobutanes was distilled over coarse soda lime contained in an iron tube heated to a temperature of about 700-730° C. The volatile products coming from the tube were passed thru several condensers and wash bottles and finally absorbed in chloroform or ligroin, the reaction product comprising butadiene-1,3 which was formed by removal of the chlorine content of the dichlorobutanes in the form of hydrogen chloride.

The following example illustrates my mode of preparing butadiene according to this invention:

Example I

Two liters of n-butyl chloride, prepared from n-butyl alcohol according to the method of Norris (supra) were introduced into a 3 liter round-bottomed flask supported over an electric heating plate, the flask being provided with a thermometer adapted to be partially immersed in the liquid. The flask was provided with a vertical glass vapor tube surmounted by a reflux condenser, the vapor tube and reflux condenser comprising a continuous passage for the vapors generated by the butyl chloride contained in the round-bottomed flask. The vapor tube was provided with a passage for introducing chlorine into the vapor space, and was subjected to light emitted from a 1000 watt lamp placed in close proximity to the vapor tube. The butyl chloride was heated to boiling and when the butyl chloride vapors filled the vapor tube, chlorine was passed into the vapor tube, and the 1000 watt lamp turned on. The chlorine was passed in at a rate of about 1120 cc. per minute. At the beginning of the chlorination the temperature was 77° C., the boiling point of butyl chloride. As the distillation proceeded the temperature of the liquid rose, and the chlorination was allowed to proceed until the temperature reached 115° C. This required about 6 hours. If the temperature had been allowed to go much higher than 115° C. some more highly chlorinated products would have been formed. After the reaction was completed, the chlorinated mixture was roughly fractionated thru a column one meter long filled with glass beads. The results of 4 runs carried on under the conditions described above are recorded in Table I.

TABLE I

*Chlorination experiments on butyl chloride*

| Run No. | 1 | 2 | 3 | 4 | 5 | 6 | Residue |
|---|---|---|---|---|---|---|---|
| | 77–110° | 110–120° | 120–130° | 130–140° | 140–150° | 150–160° | |
| | Grams | Grams | Grams | Grams | Grams | Grams | Grams |
| 1 | 242 | 330 | 503 | 546 | 166 | 132 | 100 |
| 2 | 382 | 300 | 472 | 552 | 191 | 127 | 114 |
| 3 | 392 | 252 | 418 | 516 | 169 | 138 | 100 |
| 4 | 292 | 345 | 500 | 540 | 207 | 122 | 107 |

Fraction 1 contained mostly unreacted butyl chloride. Fraction 2 probably contained dichloro-1,1-butanes. Fraction 3 contained most of the dichloro-1-2-butane, Fraction 4 contained most of the dichloro-1,3-butane, Fraction 6 contained most of the dichloro-1,4-butane, and Fraction 5 was probably a mixture of Fractions 4 and 6.

The different fractions of dichlorobutane were now separately distilled over heated soda lime. The dichlorobutane fractions were passed in the form of vapors into a steel tube containing 450 g. of coarse soda lime, the tube being heated to about 700–730° C. by means of an electric furnace. The vapors passing out of the tube traveled in succession thru cooling vessels to remove water, unreacted dichlorobutane and tarry and resinous products from the reacted mixture, the resulting vapors being substantially pure butadiene. A number of runs under the conditions enumerated above were made with the different fractions of dichlorobutane to determine the yield of butadiene-1,3 obtained in each of the fractions. The butadiene formed was collected as the tetrabromide by bubbling the formed butadiene vapors thru chloroform containing an excess of bromine. Complete bromination of the butadiene-1,3 caused the formation of two stereoisomeric tetrabromobutanes, one liquid and one solid and crystalline. The percentage yields of butadiene from the dichlorobutanes are calculated from the amount of tetrabromide obtained. The yields of butadiene-1,3 obtained from 200 g. of each of the chlorinated fractions of Table I are listed in Table II, each run being about one hour in duration:

TABLE II

*Percentage of butadiene obtained from each of the chlorinated fractions*

| | 1 | 2 | 3 | 4 | 5 | 6 |
|---|---|---|---|---|---|---|
| | 75–110° | 110–120° | 120–130° | 130–140° | 140–150° | 150–165° |
| Butadiene tetrabromide | Grams | Grams | Grams | Grams | Grams | Grams |
| Obtained, g | 40 | 118 | 148 | 174 | 139 | 146 |
| | 41 | 104 | 144 | 174 | | 157 |
| Yield of butadiene, percent | 6.9 | 18.8 | 24.8 | 29.6 | 23.6 | 25.6 |

From the data given in Table II it is noted that the dichloro-1,3-butane fraction gave the best yield of butadiene, 29.6% of the theoretical.

In addition to the new process for preparing butadiene, the invention relates to the production from butadiene of various chlorine substituted hydrocarbons. The procedure followed comprises generally the chlorination of butadiene preferably under conditions adapted to produce the dichlorobutenes almost exclusively. The dichlorobutenes are then heated in the presence of powdered potassium hydroxide with the splitting off of a molecule of hydrochloric acid, resulting in the formation of chloro-1-butadiene. The following examples illustrate this latter phase of the invention:

Example II

The butadiene produced in accordance with Example I was passed as soon as it was formed into a chlorination tube half filled with carbon disulfide, a slow stream of chlorine gas being introduced at the same time as the butadiene, both the chlorine and butadiene being introduced under the surface of the carbon disulfide. The chlorination tube was immersed in an ice-salt bath. At the completion of the run (about one hour for the quantity of butadiene produced from 200 g. of the chlorinated Fraction 4 of Example I) the chlorinated mixture was removed and freed from carbon disulfide by means of suction, the residual oil being subjected to fractional distillation. After several redistillations four fractions were collected under 40 mm. pressure: (a) 45–45.5°; (b) 75–76°; (c) 110–111°; (d) 130–134°. Each fraction was analyzed for chlorine. Fraction (a) was found to be dichloro-1,2-butene-3, a colorless oil distilling at 45–45.5° C. under 40 mm. pressure and at 115° C. under atmospheric pressure, its refractive index as determined by an Abbe refractometer at 30.5° C. being 1.4550. Fraction (b) was found to be dichloro-1,4-butene 2, distilling at 75–76° C. at 40 mm. pressure and at about 145° C. at atmospheric pressure. It was obtained when first distilled as a yellow oil with a pungent odor, but after several distillations it was obtained as a colorless oil with a very faint odor. Its refractive index at 30.5° C. was 1.4745. Fractions (c) and (d) were two stereoisomeric tetrachlorobutanes. Fraction (c) distilled at 110–111° C. under 40 mm. pressure and was a colorless oil with a faint odor. Fraction (d) was a crystalline solid melting at 72° C.

The two dichlorobutenes, namely, the 1,2 and 1,4 isomers were found to polymerize to dark, solid resinous polymers when subjected to the action of condensation catalysts such as sulfuric acid, zinc chloride, ferric chloride, and boron trifluoride. They were also found to polymerize under the catalytic action of alkaline reagents such as potassium hydroxide, sodium hydroxide, calcium oxide, soda-lime, ammonia, substituted amines and the like. These latter polymers are brown, solid resins.

Although carbon disulfide has been referred to as a suitable solvent for use in the chlorination, this was mentioned merely by way of illustration. Other solvents having equivalent properties may be used in lieu thereof.

Example III

Dichloro-1,4-butene-2 was heated to about 90° C. in a reaction flask with twice its weight of powdered potassium hydroxide, a vigorous reaction occurring and a lower boiling chloride forming and distilling over through a condenser which was attached to the reaction flask. After several fractionations a colorless liquid was obtained which boils at 67–68° C. under atmospheric pressure. Analysis for chlorine and other tests have shown this product to be chloro-1-butadiene 1,3 (CH(Cl)=CH—CH=CH$_2$). It polymerizes spontaneously on standing, has a density at 20° C. of about 0.958 and a refractive index ($N_D^{20}$) of about 1.470.

In addition to the monochloro-1-butadiene-1,3, the reaction mixture resulting from the alkaline treatment of the dichlorobutenes contains monovinylacetylene (CH$_2$=CH—C≡CH) produced by the removal of two molecules of hydrogen chloride from dichlorobutene. Another acetylenic compound was also contained in the reacted mixture, the acetylenic nature of the compound being determined by its capability of reacting with ammoniacal silver nitrate and copper sulfate to give the typical test. This compound has a lower boiling point than chloro-1-butadiene-1,3. If powdered potassium hydroxide is used as the alkaline reagent for the treatment of the dichlorobutenes the reaction mixture contains some resinous material obtained as a solid residue after distillation, this residue presumably being a mixture of polymers of chloro-1-butadiene-1,3 and of monovinylacetylene. Chloro-1-butadiene-1,3, monovinylacetylene and the other acetylenic compound referred to, each polymerize on standing to almost colorless resins which are soluble in the usual organic solvents, and appear to be useful as plastics. These compounds need not be separated but may be polymerized in the form of a mixture to give an almost colorless resin. The polymerization of these products can be carried out with the usual polymerizing agents, but polymerization is preferably carried out under pressure in the presence of air and with exposure to light.

Example II has been limited to the chlorination of butadiene. Other diene compounds may be treated in the same way to produce addition products similar in character to the dichloro-1,2- and dichloro-1,4-butenes, and the chloro-1-butadiene-1,3.

Thus, 2,3-dimethylbutadiene (prepared by prior art methods from pinacol) has been chlorinated to produce two dichlorides, probably the 1,2- and 1,4-dichlorides of 2,3-dimethylbutadiene, and also two tetrachlorides of 2,3-dimethylbutadiene. On heating the mixture of the two dichlorides with an alkaline agent, hydrogen chloride was eliminated to give the monochloro-1-derivative of 2,3-dimethylbutadiene which polymerizes to give a resin. Other homologues of butadiene having the formula

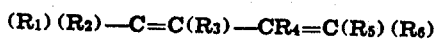
$$(R_1)(R_2)—C=C(R_3)—CR_4=C(R_5)(R_6)$$

in which $R_1$, $R_2$, $R_3$, $R_4$, $R_5$, and $R_6$ are hydrogen or alkyl groups may be treated in the same manner to yield similar results.

Although the only agent mentioned in Example III for removing hydrogen chloride from dichloro-1,4-butene-2 is powdered potassium hydroxide, it is to be understood that the invention is not so limited. The use of alkaline agents generally for this purpose is contemplated in connection with dichloro-1,4-butene-2 as well as its higher homologues, as set forth in the preceding paragraph. Caustic alkali is, however, preferred.

I claim:

1. The process of preparing dichloro derivatives of a hydrocarbon of the class consisting of butadiene and its homologues which comprises reacting said hydrocarbon with an amount of chlorine insufficient for complete addition reaction.

2. In the process of preparing dichlorobutenes, the step which comprises reacting butadiene with an amount of chlorine insufficient for complete addition reaction.

3. The process of preparing dichloro derivatives of a hydrocarbon of the class consisting of butadiene and its homologues which comprises reacting said hydrocarbon with chlorine and then separating the resulting dichloro derivatives by fractional distillation.

4. In the process of preparing dichlorobutenes, the step which comprises reacting butadiene with chlorine and then separating the resulting dichloro derivatives by fractional distillation.

5. The process which comprises reacting a hydrocarbon of the class consisting of butadiene and its homologues at low temperature with an amount of chlorine insufficient for complete addition reaction.

6. The process which comprises reacting butadiene at low temperature with an amount of chlorine insufficient for complete addition reaction.

7. The process which comprises reacting a hydrocarbon of the class consisting of butadiene and its homologues at low temperature with an amount of chlorine insufficient for complete addition reaction and in the presence of an inert solvent.

8. The process which comprises reacting butadiene at low temperature with an amount of chlorine insufficient for complete addition reaction and in the presence of an inert solvent.

9. The process which comprises reacting butadiene at low temperature with an amount of chlorine insufficient for complete addition reaction and in the presence of carbon disulfide.

10. The process which comprises reacting a dichloro compound produced by chlorinating a hydrocarbon of the class consisting of butadiene and its homologues with an alkaline agent.

11. The process which comprises reacting a dichloro compound produced by chlorinating butadiene with an alkaline agent.

12. The process which comprises reacting a dichloro compound produced by chlorinating a hydrocarbon of the class consisting of butadiene and its homologues with caustic alkali at an elevated temperature.

13. The process which comprises reacting a dichloro compound produced by chlorinating butadiene with caustic alkali at an elevated temperature.

14. The process which comprises reacting a dichloro compound produced by chlorinating butadiene with caustic alkali at a temperature of about 90° C.

15. The process which comprises reacting dichloro-1,4-butene-2 with caustic alkali at about 90° C.

16. The process which comprises polymerizing a member of the group consisting of dichloro-1,4-butene-2 and dichloro-3,4-butene-1.

17. The process which comprises polymerizing a dichloro compound produced by chlorinating a hydrocarbon of the class consisting of butadiene and its homologues.

18. Dichloro-3,4-butene-1.

19. Dichloro-1,4-butene-2.

20. The process which comprises polymerizing chloro-1-butadiene-1,3.

21. Chloro-1-butadiene-1,3.

22. A polymer of chloro-1-butadiene-1,3.

23. The process which comprises reacting dichloro-1,4-butene-2 with an alkaline agent and then separating chloro-1-butadiene-1,3 from the reaction mixture.

24. The process which comprises reacting dichloro-1,4-butene-2 with an alkaline agent at an elevated temperature and then separating chloro-1-butadiene-1,3 from the reaction mixture.

25. The process which comprises reacting dichloro-1,4-butene-2 with caustic alkali at about 90° C. and then separating chloro-1-butadiene-1,3 from the reaction mixture by fractional distillation.

26. The process which comprises reacting a dichloro compound produced by chlorinating a hydrocarbon of a class consisting of butadiene and its homologues with an alkaline agent and then polymerizing the mixture so obtained.

27. The process which comprises reacting a dichloro compound produced by chlorinating butadiene with caustic alkali at an elevated temperature and then polymerizing the mixture so obtained.

28. The process which comprises reacting a dichloro compound produced by chlorinating butadiene with caustic alkali at about 90° C. and then polymerizing the mixture so obtained.

29. The product produced by the process of claim 26.

30. The product produced by the process of claim 27.

31. The product produced by the process of claim 28.

32. The process which comprises reacting a dichloro compound produced by chlorinating butadiene with caustic alkali at about 90° C. and then polymerizing the mixture so obtained under pressure in the presence of air and with exposure to light.

IRVING ELKIN MUSKAT.